(12) United States Patent
Gendelman

(10) Patent No.: US 10,108,168 B2
(45) Date of Patent: Oct. 23, 2018

(54) INDUSTRIAL CONTROL SYSTEM SMART HARDWARE MONITORING

(71) Applicant: Ilan Gendelman, Arsuf-Kedem (IL)

(72) Inventor: Ilan Gendelman, Arsuf-Kedem (IL)

(73) Assignee: Si-Ga Data Security (2014) Ltd., Arsuf-Kedem (IL)

( * ) Notice: Subject to any disclaimer, the term of this patent is extended or adjusted under 35 U.S.C. 154(b) by 392 days.

(21) Appl. No.: 14/718,192

(22) Filed: May 21, 2015

(65) Prior Publication Data

US 2015/0346706 A1 Dec. 3, 2015

Related U.S. Application Data

(60) Provisional application No. 62/006,192, filed on Jun. 1, 2014.

(51) Int. Cl.
*G05B 9/02* (2006.01)
*G05B 19/05* (2006.01)

(52) U.S. Cl.
CPC .. *G05B 19/058* (2013.01); *G05B 2219/14008* (2013.01)

(58) Field of Classification Search
CPC .................................................. G05B 19/058
USPC .......................................................... 700/79
See application file for complete search history.

(56) References Cited

U.S. PATENT DOCUMENTS

| | | | |
|---|---|---|---|
| 4,802,220 A | 1/1989 | Marker, Jr. | |
| 5,719,937 A | 2/1998 | Warren et al. | |
| 6,115,533 A | 9/2000 | Tahara et al. | |
| 6,115,535 A | 9/2000 | Iwamoto et al. | |
| 6,167,136 A | 12/2000 | Chou | |
| 6,219,788 B1 | 4/2001 | Flavin et al. | |
| 6,668,246 B1 | 12/2003 | Yeung et al. | |
| 6,885,748 B1 | 4/2005 | Wang | |
| 6,986,047 B2 | 1/2006 | Giles et al. | |
| 7,181,625 B2 | 2/2007 | Peled et al. | |
| 7,216,369 B2 | 5/2007 | Wiseman et al. | |

(Continued)

OTHER PUBLICATIONS

Amer, Mennatallah & Markus Goldstein, "Nearest-Neighbor and CLustering Based Anomaly Detection Algorithms for RapidMiner", Rcomm 201—RAPIDMINER Community Meeting and Conference, Aug. 29, 2012.*

(Continued)

*Primary Examiner* — Mohammad Ali
*Assistant Examiner* — Sheela S Rao

(57) ABSTRACT

According to some embodiments of the present invention there is provided a computerized method for automatic monitoring of control systems. The method may comprise receiving electronic measurement values, measured on one or more conductors of computerized control devices, where the conductors may be a system bus conductor and/or and input-output line of a programmable logic controller. The method may comprise automatically calculating normal data patterns based on an analysis of the electronic measurement values. The method may comprise matching between new electronic measurement values measured on the computerized control devices and the normal data patterns to automatically detect abnormal data patterns. The method may comprise sending automatically an abnormal operation alert in response to the abnormal data patterns.

23 Claims, 16 Drawing Sheets

(56) References Cited

U.S. PATENT DOCUMENTS

| | | |
|---|---|---|
| 7,350,228 B2 | 3/2008 | Peled et al. |
| 2004/0098609 A1 | 5/2004 | Bracewell et al. |
| 2005/0033481 A1* | 2/2005 | Budhraja ................ H02J 3/008 |
| | | 700/286 |
| 2005/0229011 A1 | 10/2005 | Ebringer et al. |
| 2007/0005961 A1 | 1/2007 | Hamblin et al. |
| 2013/0031037 A1* | 1/2013 | Brandt ................ H04L 63/1408 |
| | | 706/12 |

OTHER PUBLICATIONS

Official Action dated Nov. 3, 2006 From the US Patent and Trademark Office Re.: U.S. Appl. No. 10/051,012.
Official Action dated May 4, 2006 From the US Patent and Trademark Office Re.: U.S. Appl. No. 10/051,012.
Notice of Allowance dated Oct. 30, 2007 From the US Patent and Trademark Office Re.: U.S. Appl. No. 10/051,012.
Official Action dated Jun. 28, 2007 From the US Patent and Trademark Office Re.: U.S. Appl. No. 10/051,012.
Symantec "Intelligent Updater Notification Page", Symantec Security Response, 2 P., 1995-2005.
Symantec "Norton AntiVirus for Windows 95/98 User Guide", Norton AntiVirus Version 5.0, Symantec Corporation, p. 1-62, 1990-1998.

* cited by examiner

INDUSTRIAL CONTROL SYSTEM SMART HARDWARE MONITORING

RELATED APPLICATION

This application claims the benefit of priority under 35 USC 119(e) of U.S. Provisional Patent Application No. 62/006,192 filed Jun. 1, 2014, the contents of which are incorporated herein by reference in their entirety.

BACKGROUND

The present invention, in some embodiments thereof, relates to industrial control systems and, more specifically, but not exclusively, to monitoring of industrial control systems for security, maintenance, and redundancy.

Supervisory control and data acquisition (SCADA) systems, or any type of industrial control systems (ICSs), are where computer controlled systems interact with real-world processes by monitoring and controlling the analog and digital input and output from devices, such as pumps, valves, heaters, and the like. ICSs are at the center of today's technological infrastructures. ICSs are used to control and monitor from the most crucial processes, such as infrastructures for power generation, electrical transmission grids, water distribution, and transportation control, down to low scale ventilation, heating, and gas control in public or private facilities.

ICSs are comprised of programmable logic controllers (PLCs), SCADA data networks, operator and supervisor terminals, management terminals, and the like. The PLCs devices are connected to physical devices, such as pumps, meters, valves, heaters and the like, and control these physical devices using hardware interfaces, such as analog and/or digital input and/or output (I/O) electrical conductor lines, referred to herein as I/O lines. The PLCs frequently use a system bus design to attach I/O modules to the PLC processing unit, and the I/O modules contain electronics to control the output conductors and perform measurements on the input conductors. By manipulating the I/O lines in a certain order, the operation of the facility is implemented. The physical devices are operated by the PLC according to embedded logic, and each PLC is designed to work autonomously, often in groups where each PLC might control part of the process. Select information and statuses gathered by the PLCs are transferred to operator and/or supervisor terminals who have limited control of the operations according to predefined constraints, such as manual overrides of certain devices and/or operations when needed. Higher level information is transferred to management terminals for executive monitoring of the operations.

ICSs may be described as centralized and highly distributed control systems where most of the logic is performed on the level of the PLCs, which have exclusive real world connection to the physical devices. The PLC's operational logic runs automatically in real time till the logic is changed, parameters are changed, or a manual override is sent from a control terminal. ICSs are designed to provide high reliability and environmental protection, and major efforts were done to reach high values of mean time between failures (MTBF). Hence the control systems were designed to be robust, autonomous, and easily overridden by the operator and/or programmer when needed.

Current security techniques for ICS include network level security using firewalls, internet packet diodes and high security level password protected gateways. These security techniques are designed to prevent unauthorized access through the internet.

SUMMARY

According to some embodiments of the present invention there is provided a computerized method for automatic monitoring of control systems. The method may comprise receiving electronic measurement values, measured on one or more conductors of computerized control devices. The method may comprise automatically calculating normal data patterns based on an analysis of the electronic measurement values. The method may comprise matching between new electronic measurement values measured on the computerized control devices and the normal data patterns to automatically detect abnormal data patterns. The method may comprise sending automatically an abnormal operation alert in response to the abnormal data patterns.

Optionally, the one or more conductors are system bus conductors of the computerized control device, wherein the electronic measurement values correspond to any internal data and internal operations of the computerized control device.

Optionally, the one or more conductors are digital output control conductors of the computerized control device, and the electronic measurement values correspond to an external digital control operations performed by the computerized control device.

Optionally, the one or more conductors are digital input receiving conductors of the computerized control device, and the electronic measurement values correspond to an external digital input operations received to the computerized control device.

Optionally, the one or more conductor are analog output control conductors of the computerized control device, and the electronic measurement values correspond to an external analog control operations performed by the computerized control device.

Optionally, the one or more conductor are analog input receiving conductors of the computerized control device, and the electronic measurement values correspond to an external analog input operations received to the computerized control device.

Optionally, any of the electronic measurement values is an electrical voltage measurement.

Optionally, any of the electronic measurement values is an electrical current measurement.

Optionally, any of the electronic measurement values is associated with a time value of measurement, and the normal data patterns are further based on the time value of measurement.

Optionally, any of the electronic measurement values is associated with a spatial value of the computerized control device, and the normal data patterns are further based on the spatial value.

Optionally, any of the electronic measurement values is associated with a group connection value of the computerized control device to one or more second computerized control device, and the normal data pattern is further based on the group connection value.

Optionally, normal data patterns are calculated using a local outlier factor analysis.

Optionally, normal data patterns are calculated using a cluster analysis.

Optionally, normal data patterns are calculated using a k-nearest neighbor analysis.

Optionally, the computerized control devices are part of an industrial control system.

Optionally, the computerized control devices are part of an urban control system.

Optionally, the computerized control devices are part of a residential infrastructure system.

Optionally, the method is made available on a computer readable medium comprising computer executable instructions adapted to perform the methods described herein.

According to some embodiments of the present invention there is provided a computerized device for automatic monitoring of control systems. The device may comprise one or more computerized processing unit for executing processor instructions. The device may comprise a learning module which calculates automatically one or more normal data pattern based on an analysis of a two or more electronic measurement values measured on one or more conductor of one or more computerized control devices, using the one or more computerized processing unit. The device may comprise a monitoring module which matches between one or more new electronic measurement values measured on one of the one or more computerized control devices and the one or more normal data pattern to detect automatically one or more abnormal data pattern, using the one or more computerized processing unit. The device may comprise one or more data interface for receiving the two or more electronic measurement values, receiving the one or more new electronic measurement values and sending an abnormal operation alert in response to the abnormal data pattern.

According to some embodiments of the present invention there is provided a computer program product for automatic monitoring of control systems. The product may comprise a computer readable storage medium. The product may comprise first program instructions to receive a two or more electronic measurement values measured on one or more conductors of one or more computerized control devices. The product may comprise second program instructions to calculate automatically one or more normal data patterns, based on an analysis of the two or more electronic measurement values. The product may comprise third program instructions to match between one or more new electronic measurement values measured on the one or more computerized control devices and the one or more normal data pattern to detect automatically one or more abnormal data patterns. The product may comprise fourth program instructions to send automatically an abnormal operation alert in response to the abnormal data pattern. The product's first, second, third, and fourth program instructions are stored on the computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
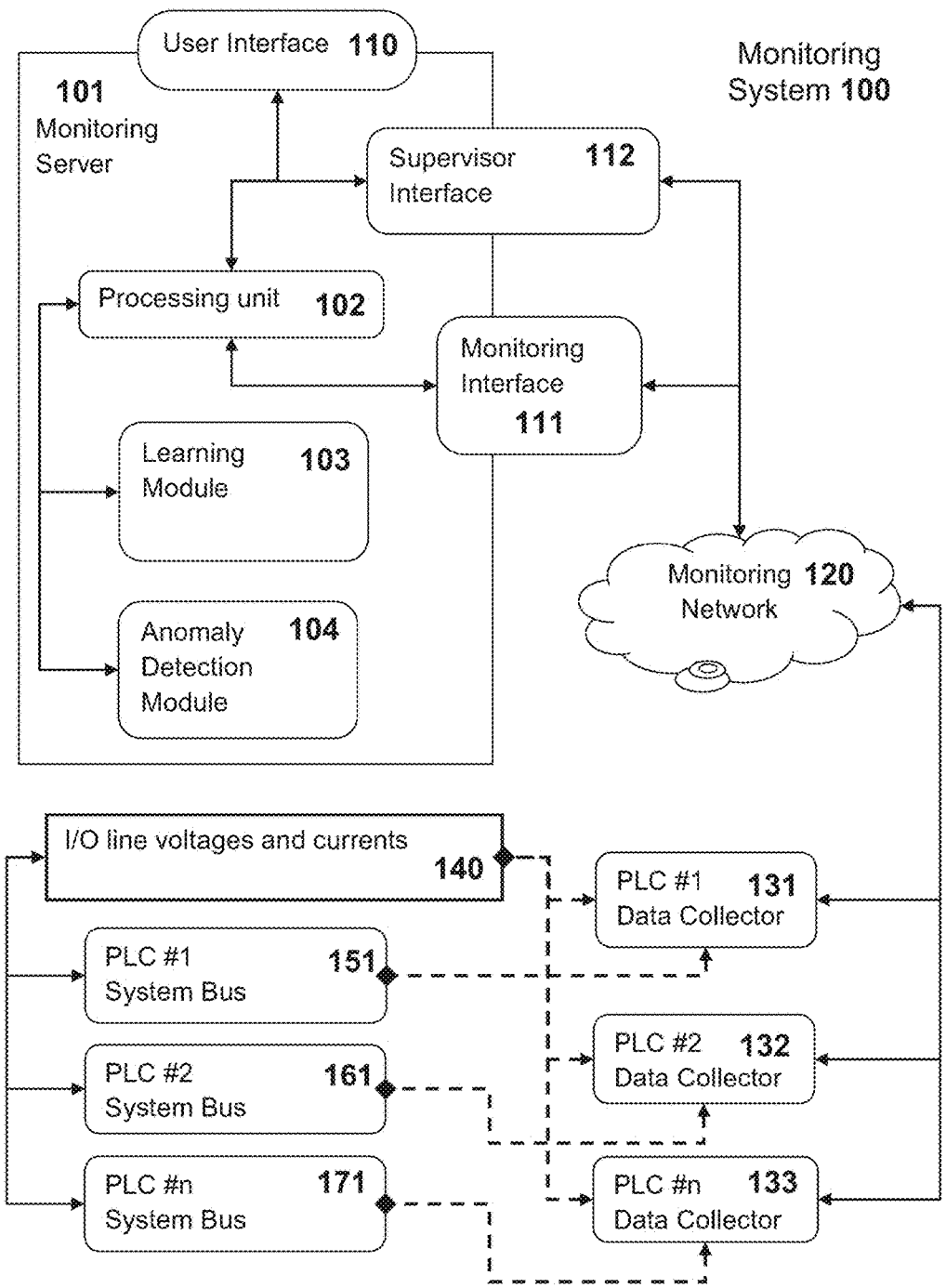
FIG. 1A is a schematic illustration of components of an abnormal activity monitoring system comprising hardware data collectors and a monitoring server for an industrial control system comprising two or more programmable logic controllers, according to some embodiments of the invention.

The present invention, in some embodiments thereof, relates to industrial control systems and, more specifically, but not exclusively, to monitoring of industrial control systems for security, maintenance, and redundancy.

Since the whole historical design concepts of ICS were not security oriented, a set of misconceptions, such as security through obscurity, physical layer protection and disconnection from the internet, have led to an erroneous sense of security by ICS managers. Such security measures prevent unauthorized outside access, but do not prevent local access within the SCADA network or direct access to the PLCs. Beyond physical security access, such as locked control boxes, there is no local security measures or monitoring at the PLC level of ICSs. Thus there exists an urgent security risk, and the mitigation of this risk is the goal of some aspects of the embodiments of the invention. Additional goals are to provide hardware monitoring of abnormal operation for other purposes, such as monitoring of unplanned malfunctions, redundancy monitoring of critical infrastructure, resource theft prevention, operator error prevention, and the like.

The enormous potential damage combined with embedded vulnerabilities make ICS high profile targets for malicious attacks. Critical national infrastructural damage will affect directly the public health and safety, and is a high profile target and threat to homeland security. The install base of ICSs is extremely large and mostly defenseless, eager for security solutions. The industry cannot afford to replace and/or upgrade existing control systems to comply with the threats and/or upcoming changes in regulations. Any monitoring system that offers to secure existing hardware will have an advantage.

ICSs were designed to be highly reliable and operate in extreme environmental conditions, such as temperature, humidity, vibration, and the like. This results in a very conservative industry, very careful and slow to adopt new technologies or changes. In addition the cost of replacing ICS hardware is extremely high. Any monitoring system needs to overlay the existing control systems, offering a full solution for existing hardware without interrupting operations or requiring control system changes.

ICSs are considered, incorrectly, as inherently secure, and only recently have their vulnerabilities become a growing source of concern. For example, the Stuxnet viruses to attack the Iranian nuclear fuel production infrastructure, or the breach of the Maroochy Water Services in Queensland, Australia. Therefore the security solutions for ICS, unlike those for information technology (IT) networks, are in an early stage of development and most current solutions are migrated solutions from the IT world that protect against unauthorized access from the internet. These solutions and approaches for securing an ICS network are focused on the communication layers and gateways, and not the PLC internal and/or external hardware interfaces. Unlike IT systems, ICSs have defined endpoint interactions with real world processes through hardware input and/or output (I/O) lines, resulting in clear operational outcomes. When the hardware interfaces were affected by an attack, the cyber defense has failed and might or might not detect the violation. Therefore, the critical defense point, and last line of defense, is the hardware interface between the PLC and the real world processes.

The monitoring systems provided here concentrate on the junction where the data and logic are converted to real world hardware actions and/or operations. Protecting this junction may prevent any source of abnormal activity from being detected and the operations halted before damage may occur. A novel architecture of securing the real world hardware end points, and the low level hardware commands that access them, results in a security paradigm that concentrates on the end points and not the paths leading to them.

Most existing solutions are supplied by the PLC manufacturers and require a vast and extremely costly hardware upgrades. Existing solutions are tailor made for each manufacturer, model, and/or protocol, requiring integration per each different produce line, and for any future products.

According to some embodiments of the present invention there is provided a monitoring system, which may comprise a method, a monitoring server and a data collection device. The combined hardware devices and software methods may monitor and identify cyber-attacks and/or any abnormal operation in industrial control systems (ICSs) and/or supervisory control and data acquisition (SCADA) systems. The data collection device may be connected to PLCs of the ICS to collect hardware data from the PLC system bus and/or I/O lines, hence concentrating on the real world interaction between the PLC and physical operations. The collected data may be transferred to the monitoring server for processing and analysis. During a learning period, data patterns may be calculated to establish the normal data patterns using machine learning approaches. During monitoring, received operation data may be processed for anomaly and outlier analysis from the previously learned normal data patterns. Based on the calculated anomalies and outliers, alerts may be sent to the appropriate response personnel of the ICS. This approach may result in protection of critical ICS operations without radical infrastructure changes.

In a broader embodiment of the invention, the hardware component may be used as a hardware verification signature for any I/O related component in the "internet of things". A supplier of an I/O control device, such as a smart gas valve for a residential building which may be viable and easy target for attack or misuse, may be able to add an independent monitoring component connected to a verification cloud with a high security level using protective attributes on a vast scale.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A, which is a schematic illustration of a schematic illustration of components of an abnormal activity monitoring system comprising hardware data collectors and a monitoring server for an industrial control system comprising two or more programmable logic controllers, according to some embodiments of the invention. This illustration may show the components and structure of the monitoring system connected to a control system, while the control system itself is depicted in other figures. A monitoring server 101 may be used to receive hardware data collected by one or more data collectors as at 131, 132, and 133 which are installed to monitor the control system PLCs (not shown in this figure). The monitoring server 101 may be comprised of a learning module 103 that receives the hardware data from the data collectors 131, 132, and/or 133 during a learning period whereby normal data patterns may be determined automatically by machine learning techniques using a processing unit 102. An anomaly detection module 104 may receive automatically operation monitoring data from the data collectors 131, 132, and/or 133, and use the processing unit 102 to compare automatically the operation data to the normal data patterns calculated from a separate learning and/or training stage. When an outlier and/or anomaly in the data patterns is detected, the anomaly detection module 104 may send an alert automatically through the user interface 110 and/or supervisor interface 112 according to the severity of the abnormal pattern. For example, if the abnormal pattern is a small deviation from the timing of a sequence of normal patterns a warning is sent to an operator, but if the abnormal pattern is a combination of abnormal patterns detected in rapid sequence from a multiple of sensitive I/O lines an alarm may be sent an operator. For example, if the rapid combination of abnormal patterns is detected together with a lack of warning from the PLC to the SCADA control terminals, a severe alarm is sent to an operator and a system security manager. The collected hardware data for the learning and/or anomaly detection modules may be received through a monitoring network 120 and monitoring network interface 111. The hardware data collectors 131, 132, and/or 133 may measure voltages and currents of the I/O lines 140 and/or the digital voltages of the conductors of the PLC system buses 151, 161, and/or 171.

Figure 1B:
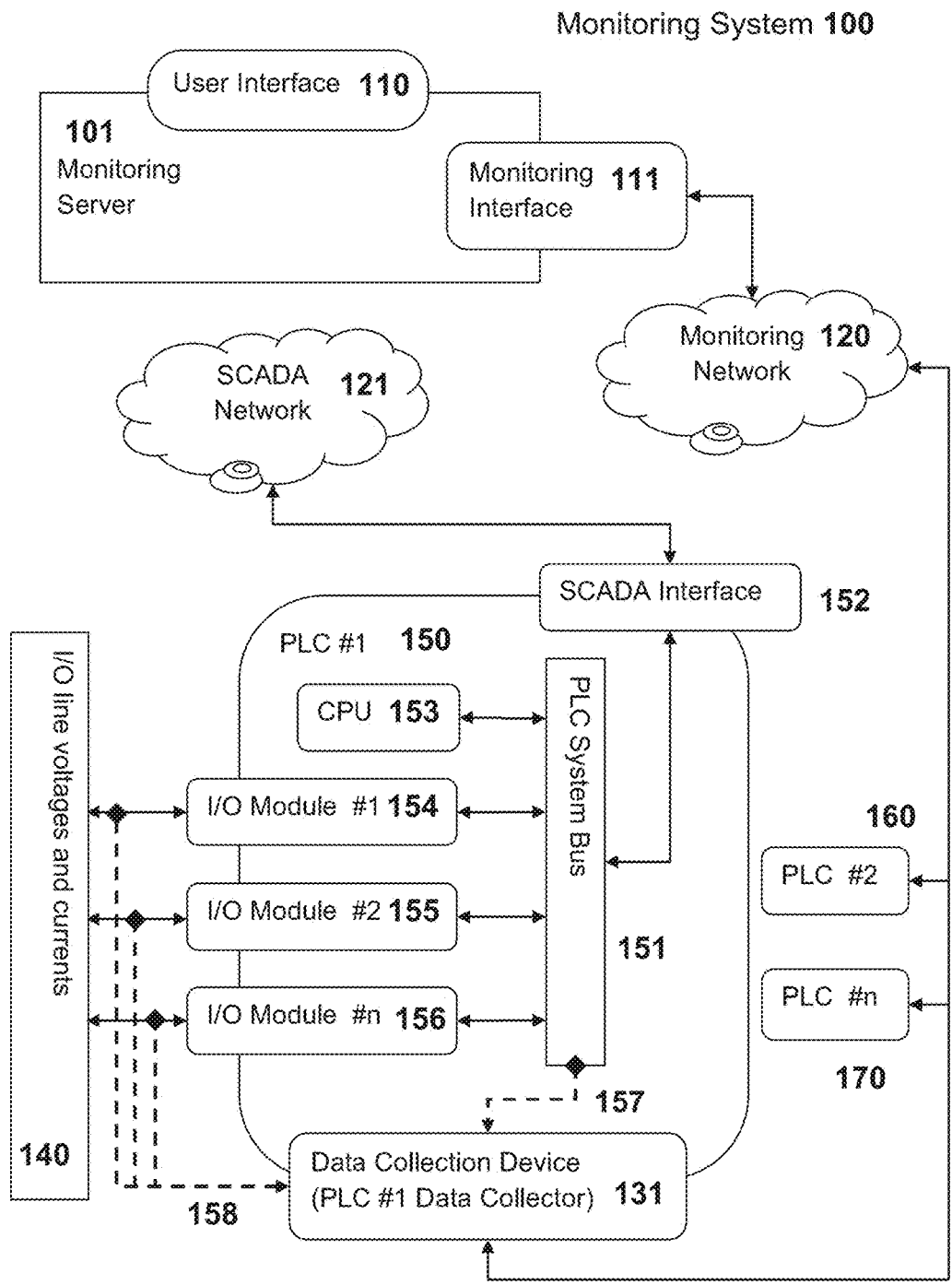
FIG. 1B is a schematic illustration of an abnormal activity for an industrial control system comprising one or more hardware data collectors and a monitoring server, showing detail of one hardware data collector connected to a one programmable logic controller in a SCADA system, according to some embodiments of the invention.

Reference is now made to FIG. 1B, which is a schematic illustration of a schematic illustration of an abnormal activity for an industrial control system comprising one or more hardware data collectors and a monitoring server, showing detail of one hardware data collector connected to a one programmable logic controller in a SCADA system, according to some embodiments of the invention. According to some embodiments of the invention, there may be a monitoring system to alert the operator, supervisor and/or manager of any abnormal activity affecting the hardware interfaces of the PLCs connected to the physical devices of the ICS, such as the PLC system buses 151 of the PLC 150 and/or the I/O line voltages and currents 140. In existing control systems, several PLCs may operate on the same physical facility to control the facility process, such as one PLC to operate valves and pumps of a boiler, and a second PLC to operate a thermostat and heater connected to the boiler. The monitoring system may comprise one or more data collector hardware devices, one of which is shown at 131, configured using an adapter 157 to be connected as a peripheral component of a PLC 150 by connection to the system bus 151. The monitoring system 100 may have additional collection devices (not shown) connected to other PLCs of the control system as at 160 and 170. Typically, all mission critical and or security sensitive PLCs of the ACAD system may be protected with the monitoring system using the data collection devices. The PLC 150 central processing unit 153 issues I/O commands to the I/O modules 154, 155, and/or 156 of the of the PLC through the PLC system bus 151. For example, the I/O modules 154, 155, and/or 156 are connected to the base-plate and/or system bus 151 of the PLC. The hardware component 131 may collect all the signals of the PLC system bus 151, and may pass the data to a monitoring server 101, optionally in real time. Optionally, the operational data may be stored on a data buffer and transferred when polled by a monitoring server. The hardware component 131 may collect 158 all the hardware signals, such as electric voltages and currents, between the PLC I/O modules 154, 155, and/or 156 and the I/O lines 140, and may pass the data to a monitoring server 101, optionally in real time. For example, the I/O lines connected to the PLC I/O modules are non-intrusively monitored using a voltage sensor and/or a current sensor, and a PLC-independent source of data is acquired for analysis which fully reflects the actual activity of the real world processes.

The anomaly detection module 104 analyzes using the processing unit 102 the collected data based on data values and temporal sequencing. The operational data being monitored may be compared automatically to the learned patterns of data for the specific PLC, temporal aspects of the data, and/or the overall patterns learned from other monitored PLCs in the ICS as determined by the learning module 103. For example, a PLC has normal data patterns with changes to controlled physical devices once every minute, a cyber attack modifies the PLC logic to issue the same changes once every 2 seconds, and the monitoring server detects automatically the abnormal temporal pattern of the same changes. In this example, the data value patterns have not changed but the timing of the patterns has been detected as being abnormal and an alert is sent to the operator. The server may use machine learning algorithms to monitor automatically any activity outside of previously learned patterns. When an abnormal data pattern, such as a pattern anomaly and/or data outlier, is detected an alert may be issued automatically to operators and/or supervisors of the ICS, such as by using a user interface 110.

The monitoring server 101 and the PLC data collection devices 131, 132, and/or 133 may be connected on a completely separate network 120 from the ICS itself 121, so that a physical barrier may be established between the normal supervisory control network 121 and abnormal activity monitoring network 120. The monitoring system may be completely isolated from the protected SCADA network and hardware using a separate data network, preventing any intruder attack on the monitoring system via the protected control system. For example, the physical separation due is based on separate electrical hard wiring of the data collector and not the data collector does not monitor data on the SCADA and/or corporate networks, allowing the monitoring system to be on a physically and/or logically separate network. Thus any attack on the monitoring system may require completely separate attacks to each system and/or network, complicating the overall attack and reducing the security risks.

An anomaly detection method may comprise a set of tools and machine learning algorithms which result in a dynamic and self adapting monitoring system. This may not be limited to cyber attacks and may alert on any abnormal activity affecting the I/O modules, either through the PLC commands issued to the I/O module or the electrical activity of the I/O lines connected to the I/O modules. For example, any malfunction of any layer of the control system and/or any operator error is detected by the hardware data activity of each protected PLC of the control system.

Figure 2:
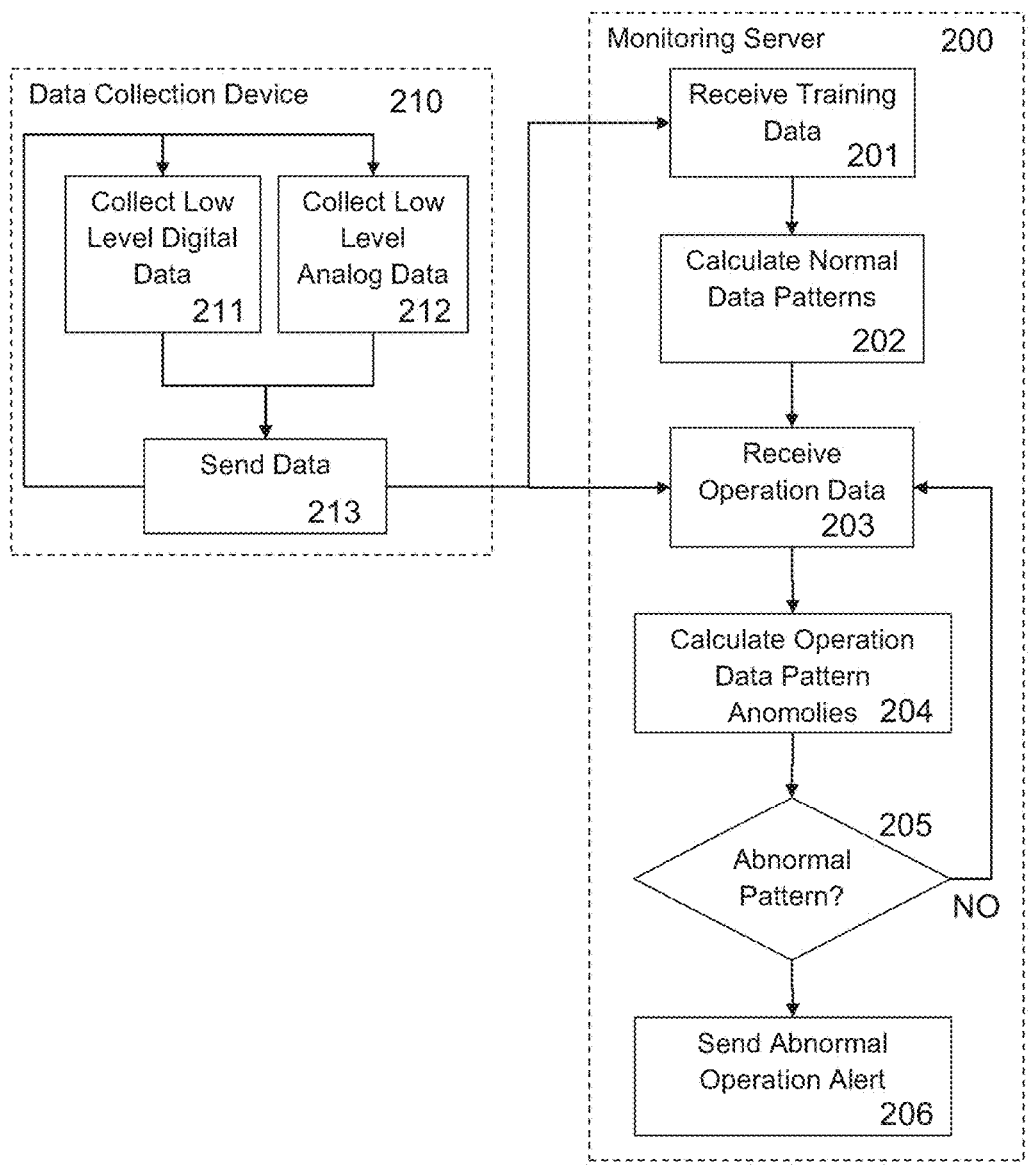
FIG. 2 is a flowchart for a method for monitoring an industrial control system, showing the actions of hardware data collectors and a monitoring server, according to some embodiments of the invention.

Reference is now made to FIG. 2, which is a flowchart for a method for monitoring an industrial control system, showing the actions of hardware data collectors and a monitoring server, according to some embodiments of the invention. The method may comprise two parallel activities, the monitoring server flowchart 200 and the data collection flowchart 210, that may work together to monitor automatically any abnormal hardware data activity. The learning module 103 of the monitoring server 101 may receive the training data from the data collectors 131, 132, and/or 133. The learning module 103 may use the processing unit 102 to analyze the hardware data and calculate normal data patterns 202 automatically. During operation monitoring, the anomaly detection module 104 of the monitoring server 101 may receive operation data from the data collectors 131, 132, and/or 133 automatically. The anomaly detection module 104 of the monitoring server 101 may calculate operation data patterns anomalies 204 automatically, and when an abnormal pattern is detected 205 and abnormal operation alert may be sent 206 automatically using the user interface 110 and/or supervisor interface 112 according to the severity of the abnormal pattern.

Data measurements of the PLC system bus electric conductors may allow automatically monitoring the raw data associated with the PLC internal activities. This data is the lowest level PLC internal data that reflects the internal logic of the PLC and the I/O line interface to the physical devices. For example, the patterns of the system bus data may reflect the physical I/O operations without intervening interpretation by a component of the control system that may be compromised, such as the PLC itself. The PLC system bus data may be a manifestation of the PLC internal logic, firmware, and setup. For example, when the digital commands to turn on a heater at when the boiler contents are cold and turn off the heater when the boiler contents are warm, the digital commands and values associated with the temperature measurements and heater operation are represented by digital data patterns on the PLC system bus. Similarly, more complex operations may have digital patterns associated with the operations detectable on the PLC system bus.

A benefit of directly connecting to the PLC system bus for data collection may be that as a monitor on the interface to the physical devices it may be very difficult for an attack on the ICS to avoid detection at the system bus hardware level. For example, an attack changing the physical process to induce damage is detected at the physical hardware level by a chance in the PLC system bus signal patterns. Also, using the PLC system bus for data collection may not affect the control system operation. Analyzing signals on the PLC system bus may be independent of the protocol, hardware, and firmware used in the PLC and/or ICS. The benefits of monitoring the PLC system bus may be that it is relatively easy to implement as this is the bottle neck through which all physical I/O line data passes, and a simple monitoring module connected to the PLC system bus may capture all internal activity of the PLC. The disadvantages of monitoring the PLC system bus are that it requires dedicated hardware to connect to the PLC make and model proprietary system bus, and that inactivity of the PLC may not be detected immediately as an operational anomaly, depending on the normal data patterns for the specific installation. For example, when the PLC logic is compromised by an attack, the PLC logic may be modified to not monitor a critical I/O line and the regulated aspect of the physical device may overheat. Monitoring the I/O lines directly may avoid this disadvantage.

Optionally, measurements of the electrical currents and/or voltages coming and going on the operational I/O lines of the PLC offers an un-intrusive and independent source of monitoring data. The I/O line data may be collected automatically instead of the PLC system bus data, or in addition to it. The automatic monitoring of data on the I/O lines directly may have the advantage of monitoring the lowest level data of the ICS system, and regardless of any violation to PLC logic, the I/O lines will reflect the true status of the physical devices. Monitoring the I/O lines may be less intrusive and allow gathering more information than the monitoring of the PLC system bus, as well as not requiring dedicated hardware to connect to the PLC system bus, making the solution completely ICS independent. For example, on a single unit PLC with no convenient access to the PLC system bus a data collation device uses the I/O line data for anomaly monitoring. For example, an operation critical PLC requiring additional security will have the I/O lines monitored in addition to the PLC system bus. For example, I/O line data is collected for new model PLCs that do not yet have a suitable PLC system bus adaptor. This I/O line data may not be dependent on the PLC hardware configuration for monitoring abnormal data patterns. For example, a PLC without plug and play access to the PLC system bus is protected by monitoring the I/O lines. Measuring operation data directly on the I/O conductors operated by the PLC, may reflect the true state of the physical devices attached to the PLC, and not dependent on an attack violation of the PLC. For example, when the PLC security is violated so as to freeze the PLC system bus and all devices and/or modules attached, a data collector device attached to that PLC system bus will appear as malfunctioning rather than send an alert that the PLC is under attack. An advantage of monitoring the I/O lines is that it may detect abnormal operation of the PLC I/O modules as well any abnormal operation of the PLC firmware and/or logic. Another advantage of monitoring the I/O lines is that more specific information may be specified during an abnormal operation alert since each I/O line is dedicated to a specific physical device. For example, abnormal operation of an I/O line connected to turbine number 6 may include this information in an abnormal operation alert. For example, abnormal operation of a critical I/O line connected to a support beam of a hydro-electric dam may alert an immediate evacuation alarm of the hydro-electric facility to prevent loss of life. Monitoring of the I/O lines may allow a bottom up algorithm approach to the monitoring system logic.

The machine learning algorithms for detecting anomalies focusing on the PLC system bus and/or I/O line levels, may take advantage of the unique attributes of the ICS. For example, I/O operations in the ICS are normally with low temporal variance, low spikes and mostly low frequency operations. This may allow easy detection, effective use of the learning stage and low false alarm rates. For example, the time series of PLC system bus or I/O line signals characteristic of normal operation show patterns of slow change, and for abnormal operation show quick change. For example, patterns associated with normal logic command between the PLC and I/O modules are analyzed and stored, and abnormal commands are identified based on a change from these normal patterns. The monitored data may exhibit low variability over time and low variability of normal operation patterns. Normal patterns can be monitored from a very low dimensional dataset. For example, any I/O line has a very clear "real world" representation which a machine learning pattern recognition algorithm can detect based on the temporal activity and/or data flow. Such detection allows a monitoring a lower dimensional data set. An abnormal activity profile, such as adjusting a turbine speed every 5 seconds when its usual operational profile is to be adjusted for 30 minutes every couple of hours may generate an abnormal operation alert.

Optionally, one or more I/O lines may be monitored for abnormal operation, and the abnormal operation detected by one or more criteria, such as a threshold value. For example, a single output line can be monitored for a threshold value, such as a control speed of a turbine. In this example, when an attack sets the turbine speed to a value over normal operation, an alarm is sent to the operator and/or security staff.

Optionally, learning data collected during a normal operation period is analyzed by machine learning methods to produce normal operation classifiers. For example, normal operation classifiers are used to monitor the collected data during a monitoring stage, and when an anomaly is detected an alert is sent according to a preconfigured alert protocol.

Some PLCs may be part of a set of PLCs, each set accountable for identical, similar, or complimentary tasks. Thus a spatial and/or temporal comparison between multiple PLCs may be done during the learning stage to determine normal patterns and during the monitoring stage to determine abnormal patterns. Anomalies may be detected by comparing the operational data patterns both to the protected PLCs patterns and to any set of selected PLCs with the same activation profile at any temporal resolution. For example, when a first PLC is responsible for the valves on a first turbine and a second PLC responsible for the same operation on a second spatially adjacent turbine, and the monitoring system is configured to monitor both PLCs as performing the same normal operations, the monitoring system will record similarities in the activation profiles of the two PLCs, and monitor for any spatial anomaly during normal operation. For example, when two PLCs operate in tandem to control a batch processing boiler, there will be a normal sequence of patterns between the PLCs associated with the normal operation. For example, one PLC would control filling and emptying the boiler and the second PLC would control the boiler heater and thermostat. For example, the normal sequence of patterns would be associated the actions of filling the boiler, turning on the heater and maintaining a temperature of 200 degrees centigrade for three hours, and then emptying the boiler. If the boiler is not emptied after the heater is turned off an abnormal operational data pattern may be detected and an alert is sent to the operator indicating a malfunction and/or security attack. For example, if one PLC controls the valves and pumps at the inlet of a pipeline, and a second PLC controls that valves and tank level at the outlet of the pipeline, the sequence of normal events would be to open both valves and operate the pump until the tank is full. An abnormal pattern may be detected if the inlet valve and pump are turned on at the first PLC but the outlet valve is not opened at the second PLC, avoiding a rupture of the pipeline. For example, when the pump is normally operated for three hours to fill the tank, and the monitoring server has not detected the normal pattern of closing the pump and vales after three and a half hours, the monitoring server may send a warning and/or alarm that there is a malfunction and/or security attack. Thus the spatial and temporal data of one or more PLCs may be analyzed for abnormal patterns to determine if a warning, alert and/or alarm should be sent to the facility personnel responsible for taking action to confirm and/or correct the operation of the facility and return the control system to normal operation.

Analysis may be performed on the collected data using semi-supervised machine learning. Some of the pattern recognition methods to detect anomalies in the data may include k-nearest neighbors (k-NN), local outlier factor (LOF), cluster analysis, and the like. Optionally, analysis may take into account the temporal dimension of the data. For example, the rate of change of the pressure in a boiler is detected as being abnormal. Optionally, pattern analysis takes into account the spatial information between the PLCs, and/or the data combined across PLCs working in a group. For example, the I/O lines of the motor control of a PLC operating a draw bridge are detected as being active but I/O line of the PLC controlling the traffic light to change from a green light to a red light are not, and an alert is sent to the operator to perform an emergency shutdown of the drawbridge.

As an add-on component to existing ICSs, which may be independent of the PLCs and control system, the methods described herein may allow full implementation of a monitoring solution without any change or upgrade to the existing hardware and/or configuration of the ICS.

Monitoring systems that collect low level hardware data from the PLCs may allow high level protection without affecting the normal operation of the ICS. For example, a quick response user override is performed on an ICS after alert by the monitoring server to an abnormal operational data pattern. This may not be limited to a particular form of attack, unlike the information technology related security protections such as white lists, logins, permission restrictions, and the like. The attack may be a cyber attack on the SCADA network or may be a physical attack to the facility. In both cases the low level hardware normal data patterns will be compromised.

The machine learning algorithms may execute a learning stage which is used to identify normal patterns of the operation characteristics by analyzing the low level hardware signals from the PLC system bus and/or the I/O lines. The benefits may include no proprietary knowledge of internal protocols of the hardware manufacturers and/or software implementation. For example, the PLC manufacturer and/or model do not play a role in the implementation and/or integration of the monitoring systems when the operational data being monitored is the I/O lines of the PLCs. These I/O lines may be operated in normal patterns according to the physical devices on the facility and the physical operation being performed. For example, when a PLC is changed to a new model and/or different manufacturer, the monitoring system collecting data from the I/O control lines would not be affected. The upgrade or replacements of a PLC may not require the replacement of the monitoring systems, but rather an execution of a new learning stage when the PLC system bus is being monitored. When a change to the physical process of the operation is made, such as a change in the time a heater is operated, or the physical devices are changed, such as pumps, thermostats and heaters, a new learning stage may detect the new normal data patterns associated with these changes. The monitoring systems may be independent of the ICS and may be applied with any set of PLC and/or physical device hardware, allowing deployment without the need for ICS changes.

The monitoring system may be fully isolated from the ICS since only the electrical signals of PLC system buses and/or I/O lines are being measured. For example, no actual data and/or communication is passing through the monitoring system, offering full protection from a cyber attack on the monitoring system itself by any means, such as buffer overflow attacks. Failure of the monitoring system hardware and/or software may affect only the monitoring capabilities and not the control system mean time between failures (MTBF), which is of high importance on ICSs as reliability is crucial for these systems. For example, monitoring I/O lines of a PLC does not affect the MTBF of that PLC or the SCADA system. The full separation of the monitoring system from the ICS may separate their MTBF performance as well, and any failure of the monitoring system affects only the monitoring system and not the ICS's reliability. For example, the monitoring network is a separate network form the SCADA network, and an attack paralyzing the SCADA network will not paralyze the monitoring system. The monitoring system may operate as a piggyback system on of the ICS, being completely separate from end to end, so that an emergency shutdown of the control system does not affect the monitoring system, and the monitoring system may send an alert to the operators and/or managers.

The monitoring system may monitor any internal autonomous instructions from the PLCs to the I/O modules, which may not be visible to a tool monitoring the communication layers between the PLC and the ICS. For example, when a PLC processor reads the value of a pressure sensor from an I/O module, the PLC logic then decides if an alert needs to be sent to the operator terminal. When an attack compromises the PLC logic, this alert may not reach the operator. A separate monitoring system may detect an abnormal pressure value directly on the PLC system bus from the data sent from the I/O module to the PLC processor or directly from the I/O line measurement of the pressure sensor reading. All existing PLC protective measures may protect against access to the PLC. Since the PLC runs its own logic and software, when these are compromised, the damage may proceed for some time before being discovered. For example, when the attack also modifies the PLC alarms. For example, an array of PLC's logic is violated to raise a limit on an array of centrifuge's shaft speeds, and the array of centrifuges fail catastrophically after three weeks. When the speeds are increased the compromised logic keeps sending the operator false readings of the correct speed, hence the data traffic over the ICS network is completely standard and normal. The monitoring systems may reduce this risk since changes from normal operation data patterns may be alerted regardless of the PLC logic and/or nature of the attack.

The monitoring system may protect against any malicious commands to harm the control system, the physical device, and/or the facility. The monitoring systems may be transparent to the type and source of the attack, and may detect any usage and/or legal operations resulting in an invalid manifestation in the operation of the ICS at the physical hardware level.

An advantage of monitoring the hardware level data of an ICS may be full access to data without privacy restrictions, as there may be in sniffing packets on IT networks. Another advantage is the easy access to training data for the machine learning algorithms, since a new installation is assumed not under attack. Unlike IT network security monitoring, which at any point is hard to determine whether it's compromised from the data transmitted over the network, the monitoring system may be in a learning stage as long as the physical devices are working normally. For example, the monitoring system is resilient to any latent threats currently in the system. The learning stage may be valid as long as the "real world" ICS devices are valid and operating normally.

In some embodiments of the present invention the monitoring system may detect physical and/or electrical changes not limited to a predefined setup and may allow many options for derived setups. For example, a monitoring system performs health and safety monitoring in fully or partially automated robotic assembly lines. For example, a monitoring system detects operator errors in critical processes. For example, a monitoring system detects misusage of resources by authorized personnel, such as stealing fuel in a factory setup.

In some embodiments of the present invention the monitoring system may be used as a verification and alerting tool by any third party to protect hardware over highly distributed and vulnerable setups, such as smart grids. The monitoring system may allow monitoring and alerting of any hardware failure, independent of the hardware manufacturer or task being performed, and is thus not limited to PLCs or ICSs.

Optionally, the monitoring systems are applicable outside industrial control system applications and are applied to the internet of things, smart cities, smart grids and the like. In these control systems virtual internet links may interact with real world processes. The rapid growth of the internet of things may benefit from the monitoring systems by supplying a third party certified cloud monitoring verification, extending the application of the monitoring system from industrial and infrastructure control systems to residential systems.

Optionally, the monitoring system may be a target for a security attack and may also be protected. The monitoring systems may be an advanced security alerting system for any given set of PLCs, supplying physical device alert mechanism, regardless of the source and/or nature of an attack. The monitoring systems may be independent of the ICS, and may be applied to any existing hardware regardless of manufacturer or model, allowing deployment without need for infrastructure changes. The monitoring systems may be fully isolated from the protected ICS network and hardware, preventing any potential attack from affecting the monitoring and alerting abilities of the monitoring systems.

The isolation of the monitoring system is mainly due to the fact that the monitoring is done on the electrical level, and there is no data flow between the protected system and the monitoring system at any level of IT data (such as network protocols). Hence, an intruder needs to be able to hack directly to the monitoring system via the monitoring network. This allows completely different level of protection for the monitoring system. For example, it is desirable to harden the ICS network as much as possible to an attack. Unfortunately, there are many limitations on such protective measures, specifically due to the ICS roles, infrastructural, operational, health & safety regulations. Those limitations do not apply on the monitoring net. For example, it would be advantageous to put the ICS in a locked enclosure, but this is not feasible since it must be accessed. For example, the monitoring system is isolated from the ICS, so it is placed in a locked enclosure without risking to negative impact on the operational aspects of the ICS.

Figure 1C:
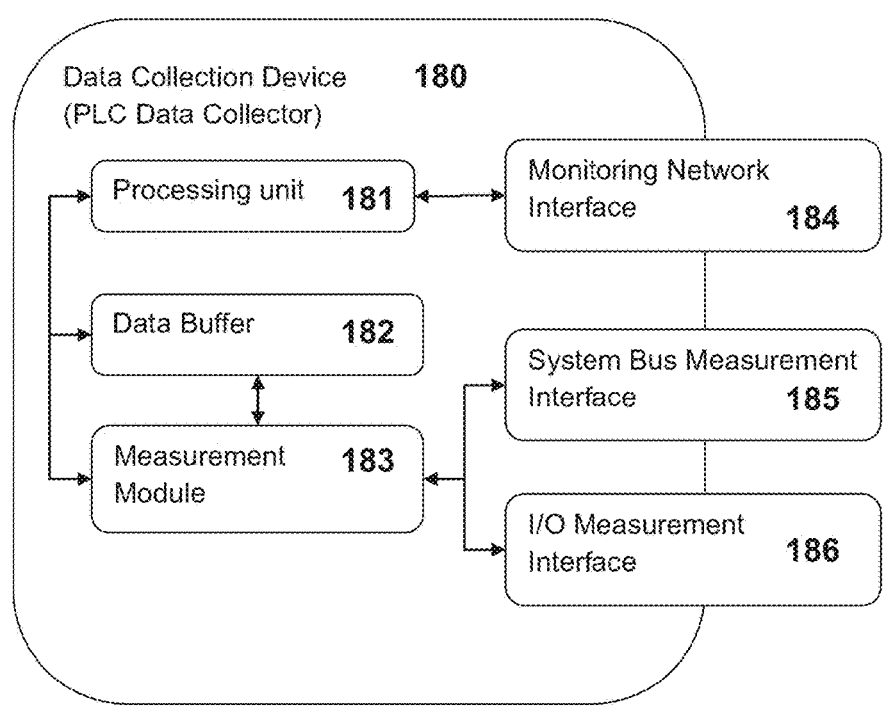
FIG. 1C is a schematic illustration of components of a hardware data collector for monitoring an industrial control system, according to some embodiments of the invention.

Reference is now made to FIG. 1C, which is a schematic illustration of components of a hardware data collector for monitoring an industrial control system, according to some embodiments of the invention. A data collection device 180 may comprise a processing unit 181 to perform the data collection operations, and transfer the data to a monitoring server using a monitoring network interface 184. Optionally, a data buffer 182 is used to store the data until successfully transferred to a monitoring server. The data collection device 180 may automatically collect hardware data using a PLC system bus interface 185 for measuring the voltages of the conductors of the PLC system bus, and an I/O measurement interface 186 to measure the voltages and currents of the I/O lines connected to the PLC I/O modules. Optionally, a ferrite toroid Hall effect current transducer is used to measure current of one or more I/O lines.

Figure 4:
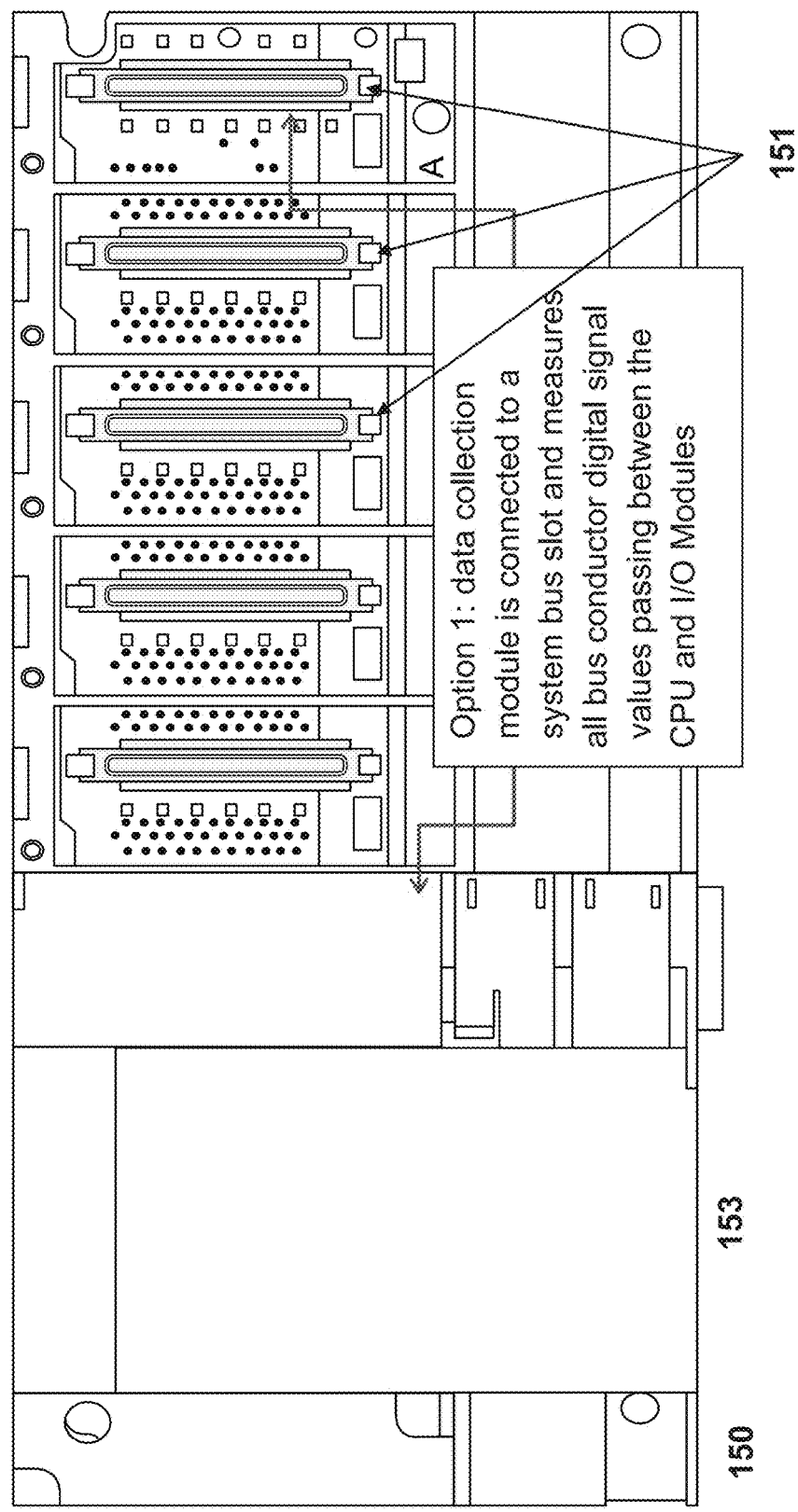
FIG. 4 is an illustration of a programmable logic controller showing an optional connection of the data collation device of a monitoring system to a programmable logic controller system bus, according to some embodiments of the invention.

Reference is now made to FIG. 4, which is an illustration of a programmable logic controller showing an optional connection of the data collation device of a monitoring system to a programmable logic controller system bus, according to some embodiments of the invention. The data collector device 180 may be connected to the PLC 150 system bus 151, and automatically measure the voltages of the PLC system bus conductors 151 to monitor the commands sent from the PLC processing unit 153 to the I/O modules connected to the PLC system bus (not shown).

Figure 5:
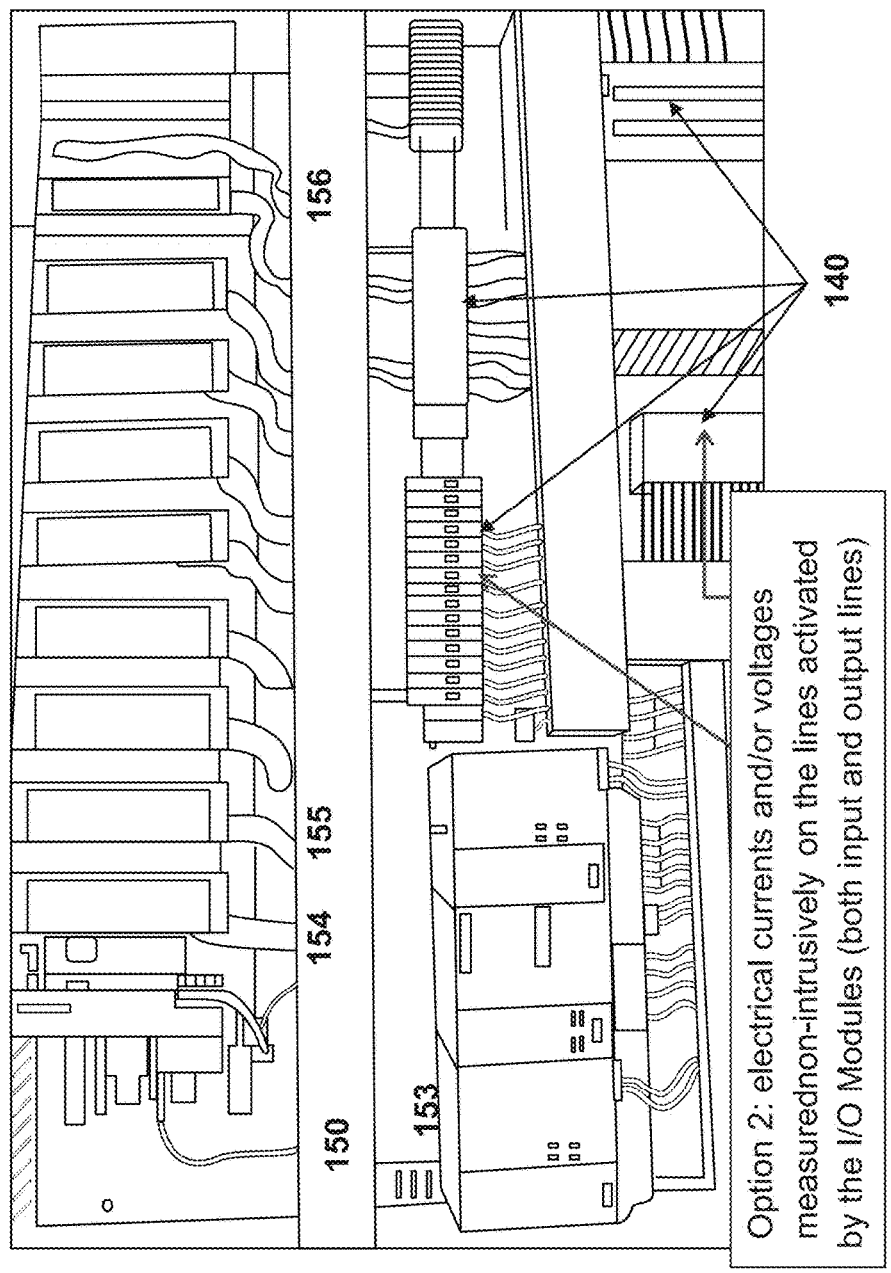
FIG. 5 is an illustration of a programmable logic controller showing an optional connection of the data collation device of a monitoring system to a programmable logic controller input and output lines, according to some embodiments of the invention.

Reference is now made to FIG. 5, which is an illustration of a programmable logic controller showing an optional connection of the data collation device of a monitoring system to a programmable logic controller input and output lines, according to some embodiments of the invention. The data collector device 180 may be connected to the I/O lines 140 that are controlled by the PLC 150, according to the logic performed by the PLC processing unit 153. The PLC processing unit 153 sends commands to the PLC I/O modules 154, 155, and/or 156, which in turn send set voltages and currents on the I/O lines 140. By analyzing the data values from the measured voltages and currents on the I/O lines 140, the monitoring server may automatically determine when abnormal operation is occurring.

Figure 3:
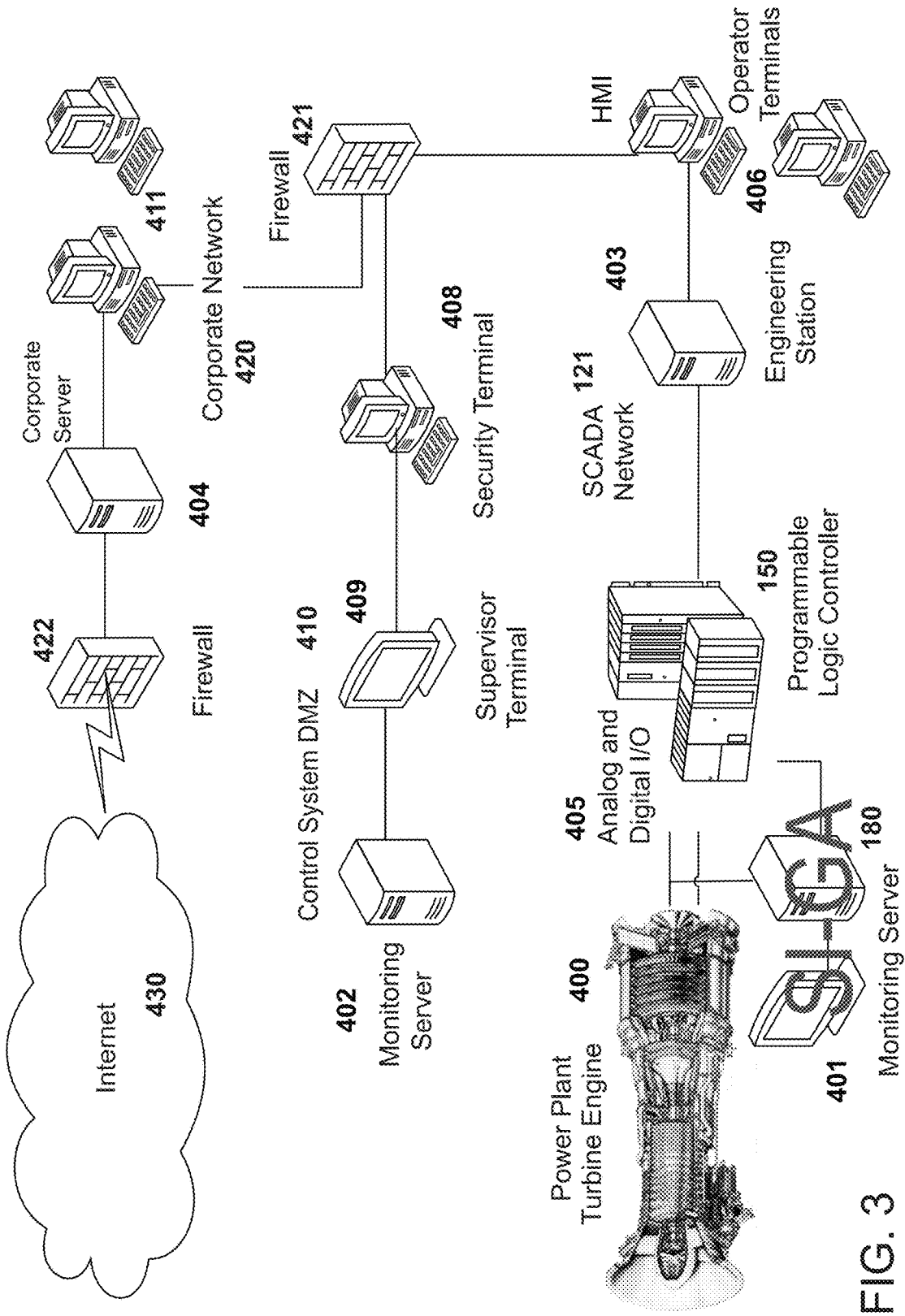
FIG. 3 is a schematic illustration of an exemplary monitoring system of an industrial control system, according to some embodiments of the invention.

Optionally, the monitoring server is connected to the data collation devices on a separate monitoring network, on the SCADA network, on a management network at a security office, on the management network near a manager terminal, and the like. Reference is now made to FIG. 3, which is a schematic illustration of an exemplary monitoring system of an industrial control system, according to some embodiments of the invention. A physical device, such as a power plant turbine engine 400 may be controlled a PLC 150 using analog and digital I/O lines 405. The PLC 150 may be connected on a SCADA network 121 to an engineering station 403 and operator terminals 406. The data collection device 180 may be connected to the PLC system bus, I/O lines 405, and to a monitoring server 401 for send an abnormal operation alert. A firewall 421 may control network access between the control system DMZ 410, the corporate network 420 and the SCADA network 121. A security terminal 408, supervisor terminal 409, and/or a server 402 may be connected on the control system DMZ 410. A manager terminal 411 may be attached to the corporate network 410. A second firewall 422 may protect access to the corporate network 410 from the internet 430.

Figure 6:
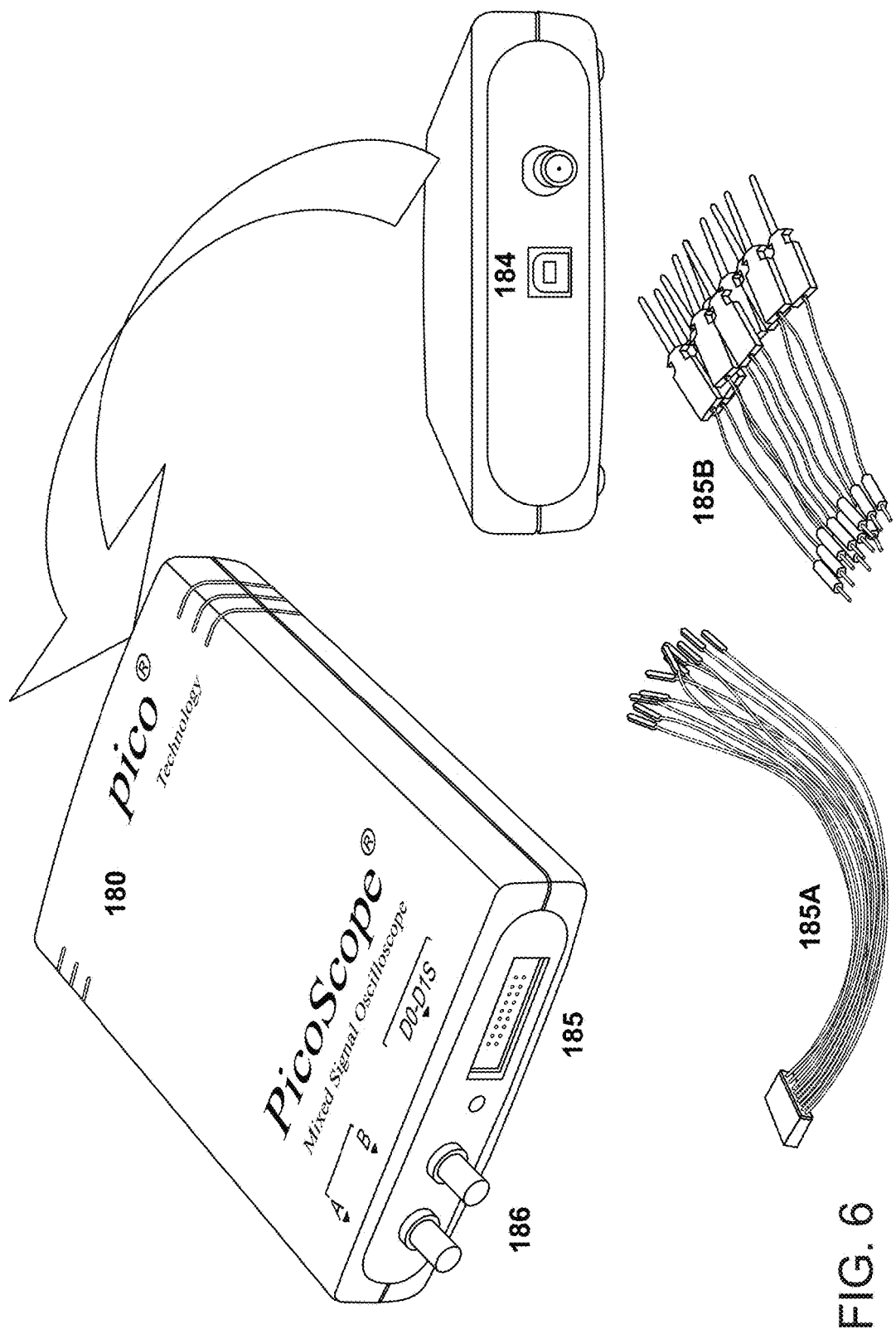
FIG. 6 is an illustration of a hardware data collector for monitoring an industrial control system, according to some embodiments of the invention.
Figure 7A:
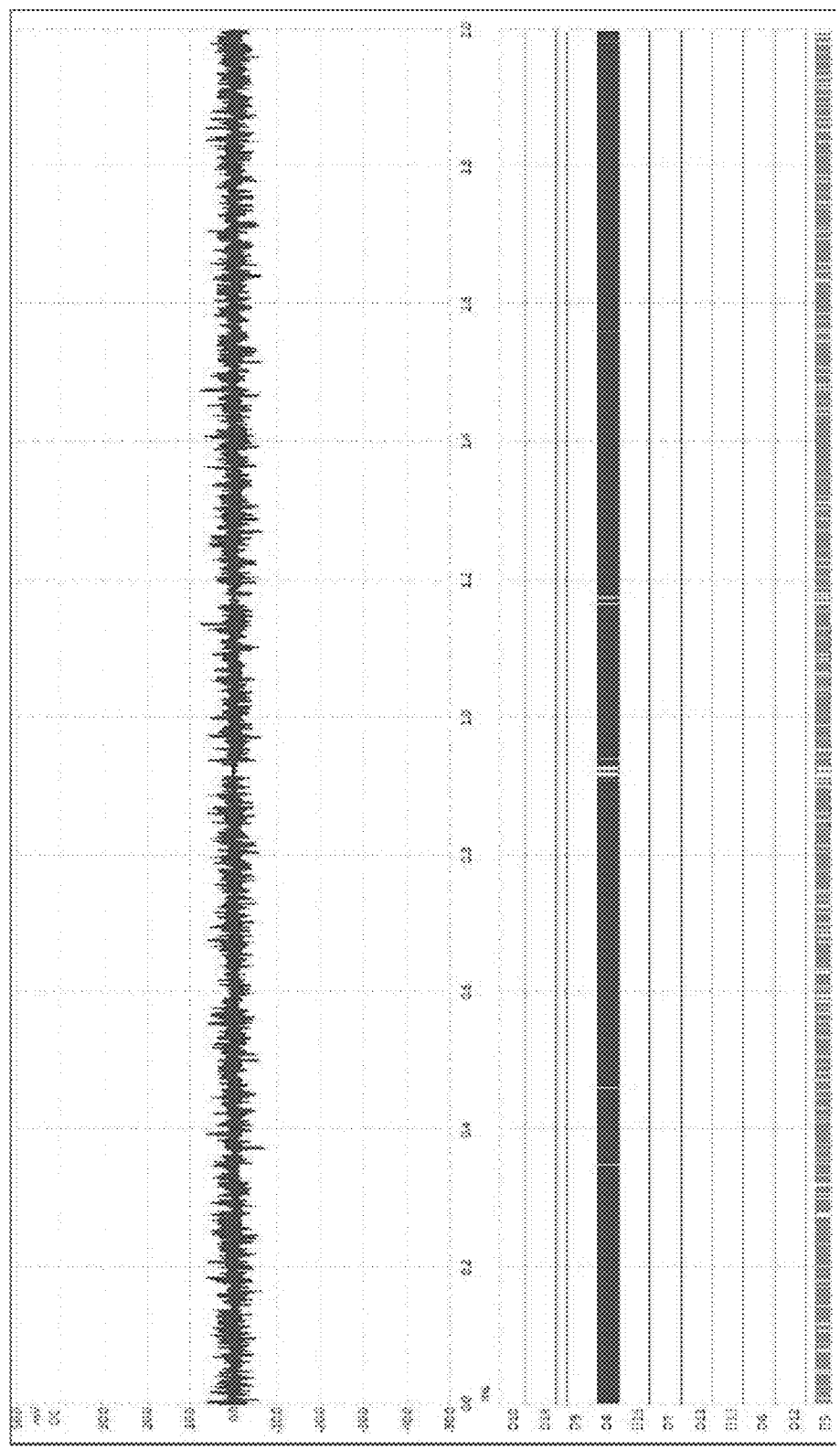
FIGS. 7A-H are graphs representing data collected from a programmable logic controller system bus by a hardware data collector for monitoring an industrial control system, according to some embodiments of the invention.
Figure 7B:
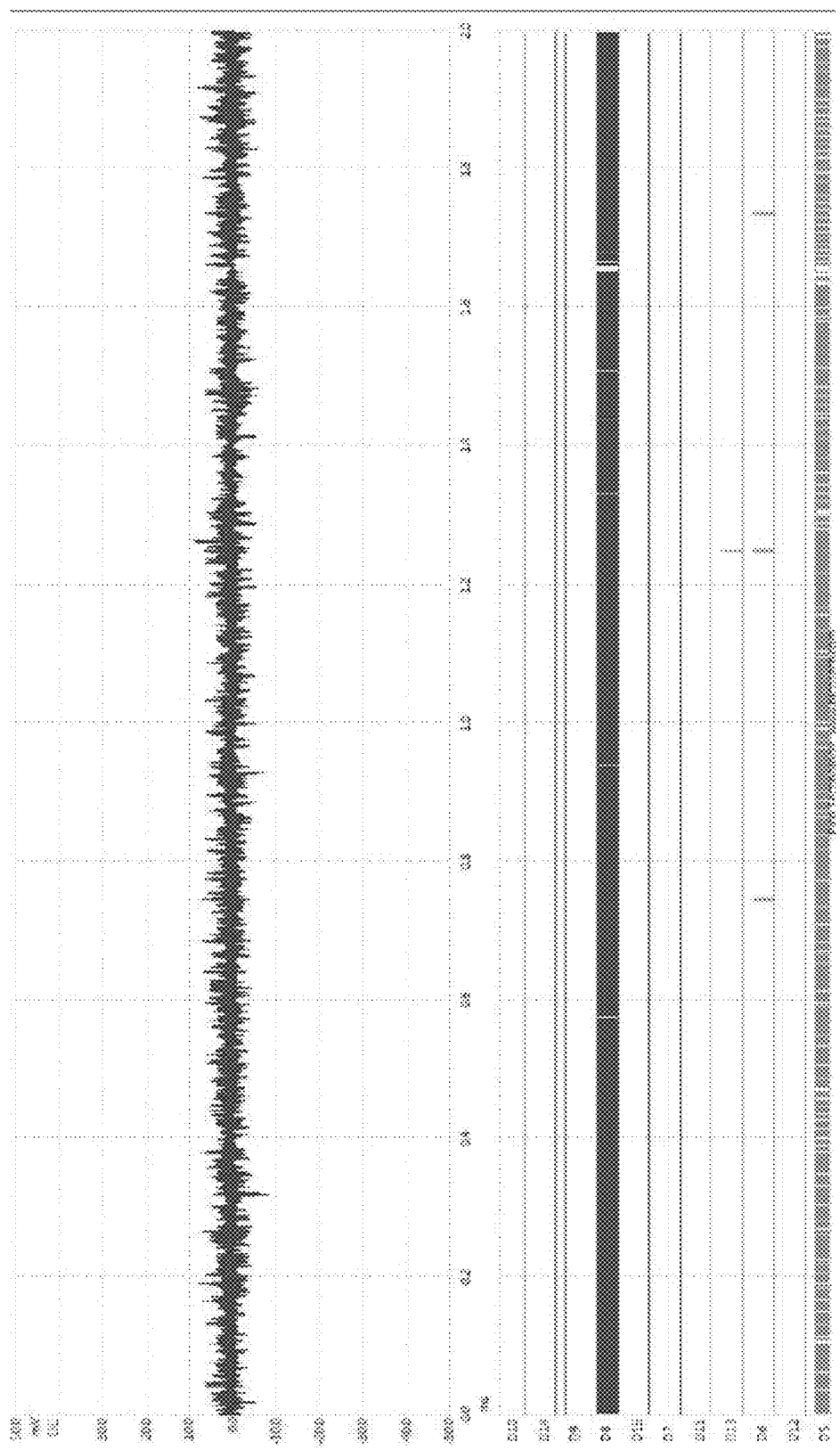
Figure 7C:
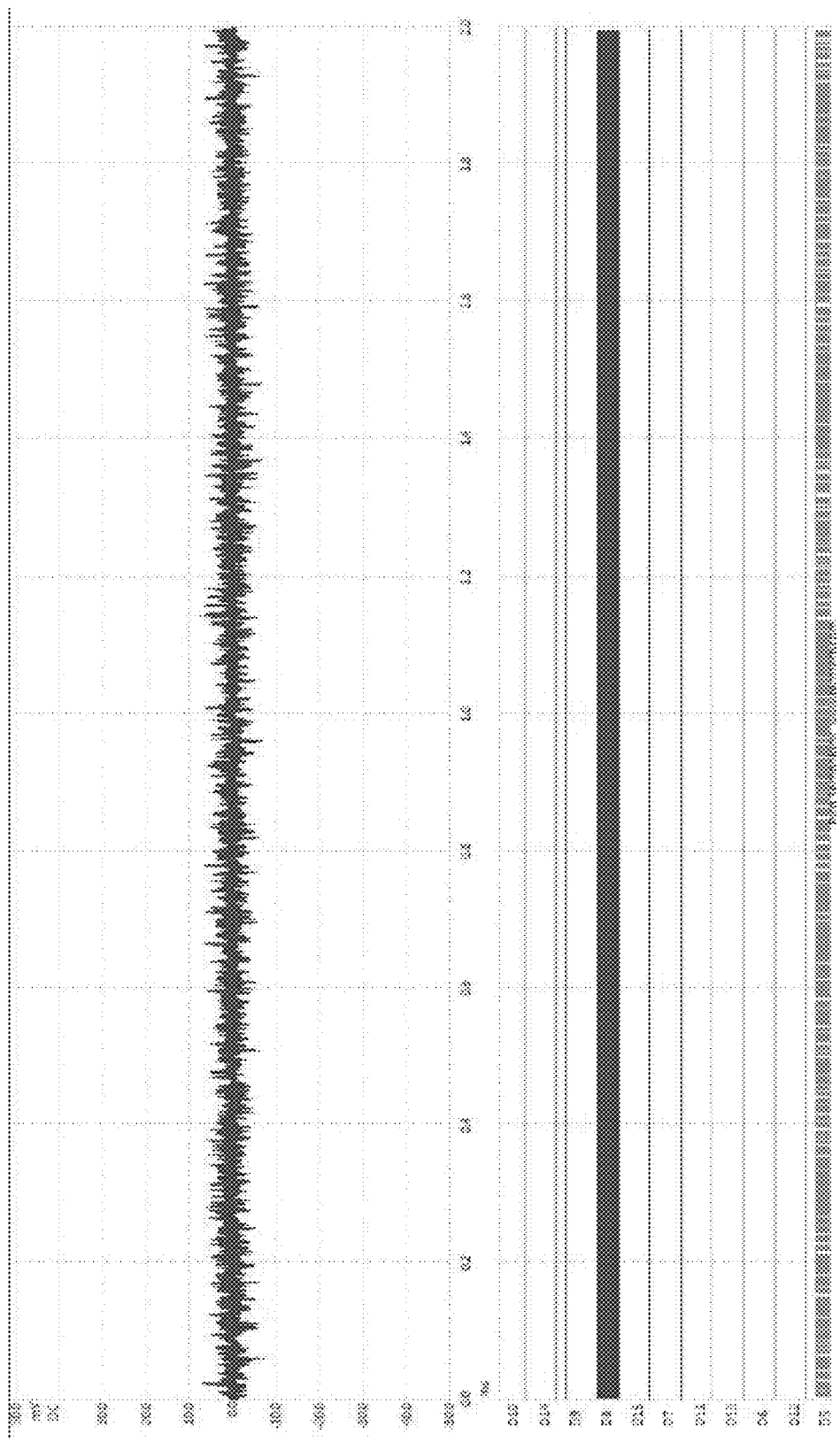
Figure 7D:
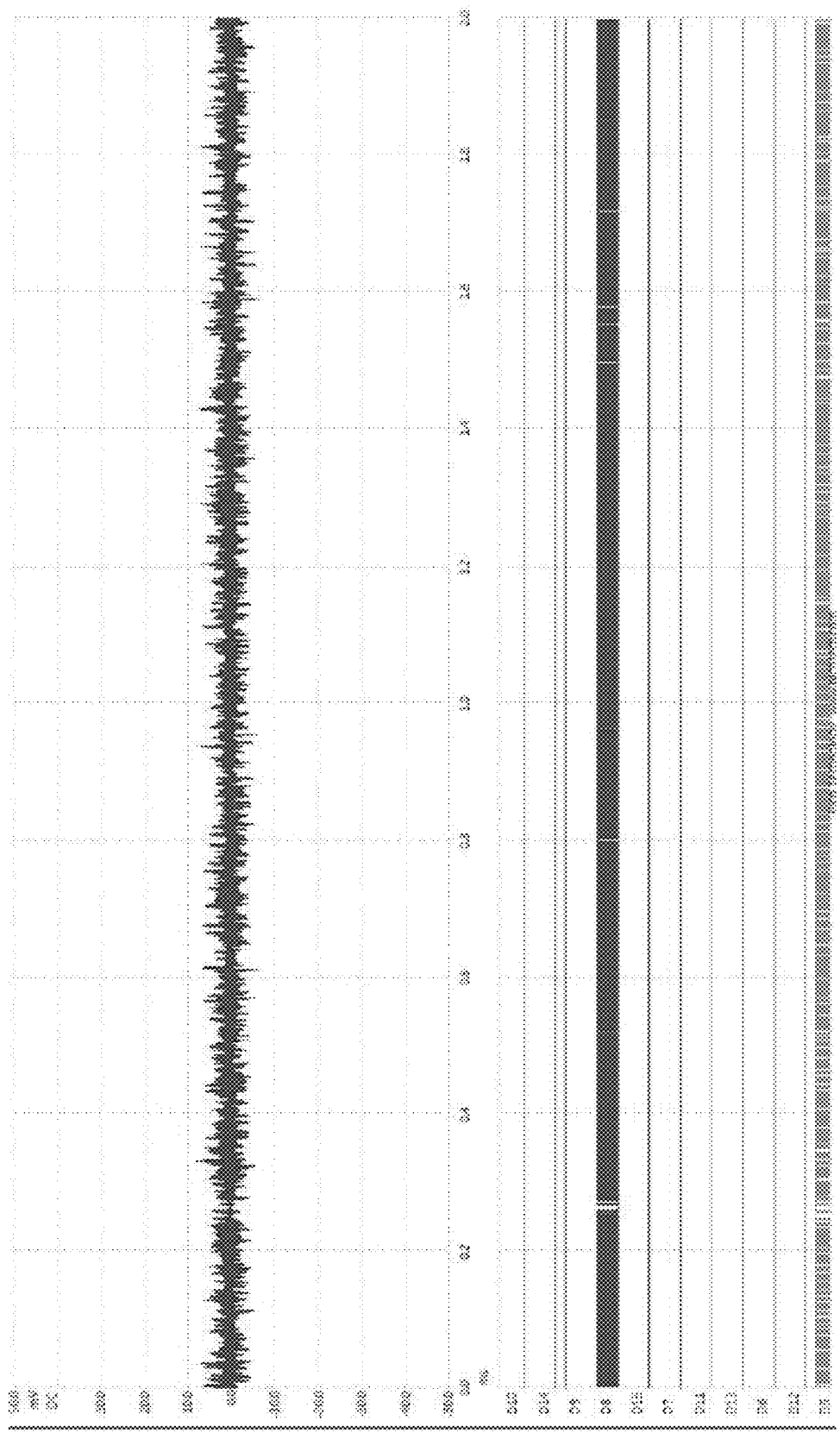
Figure 7E:
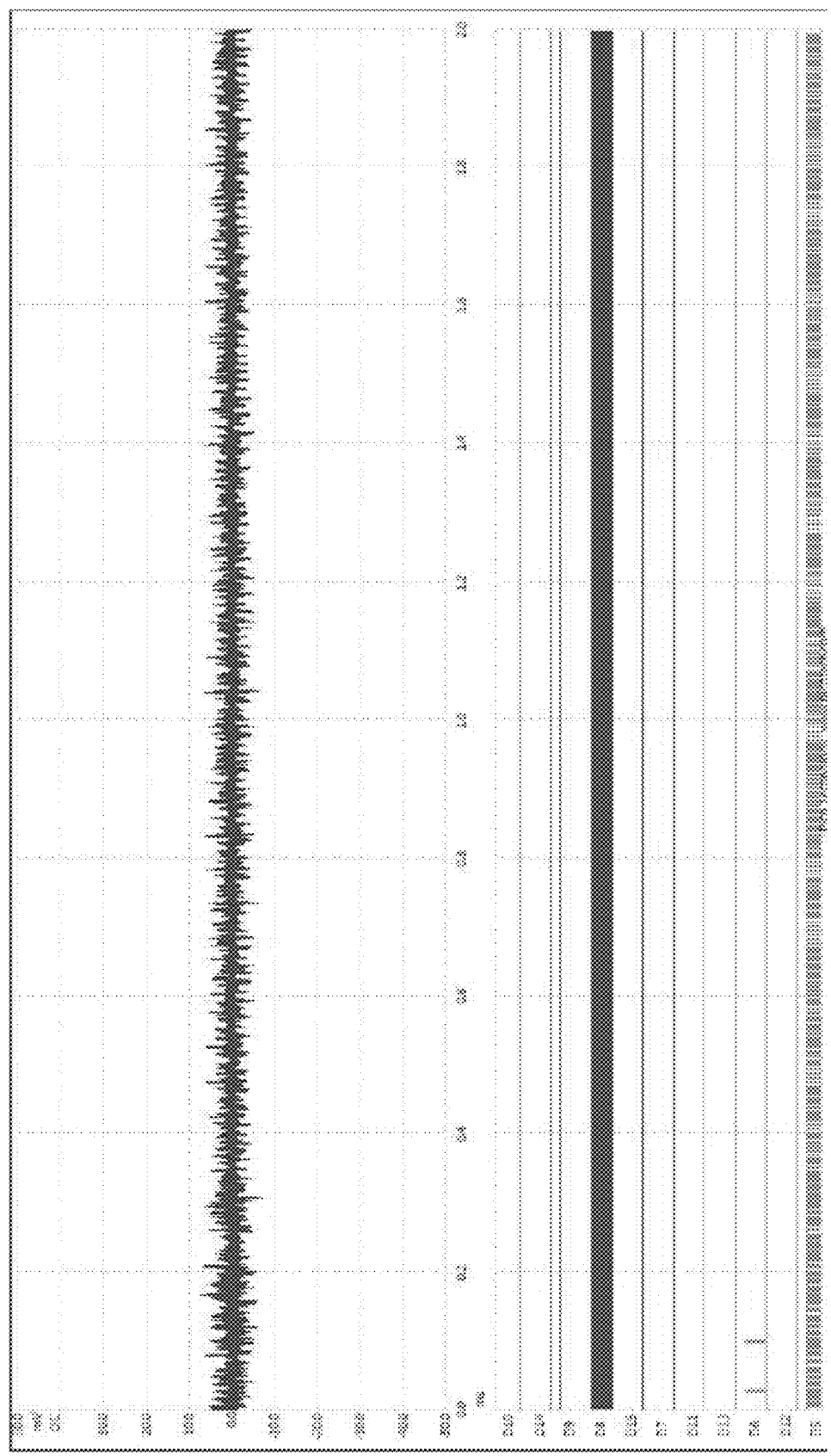
Figure 7F:
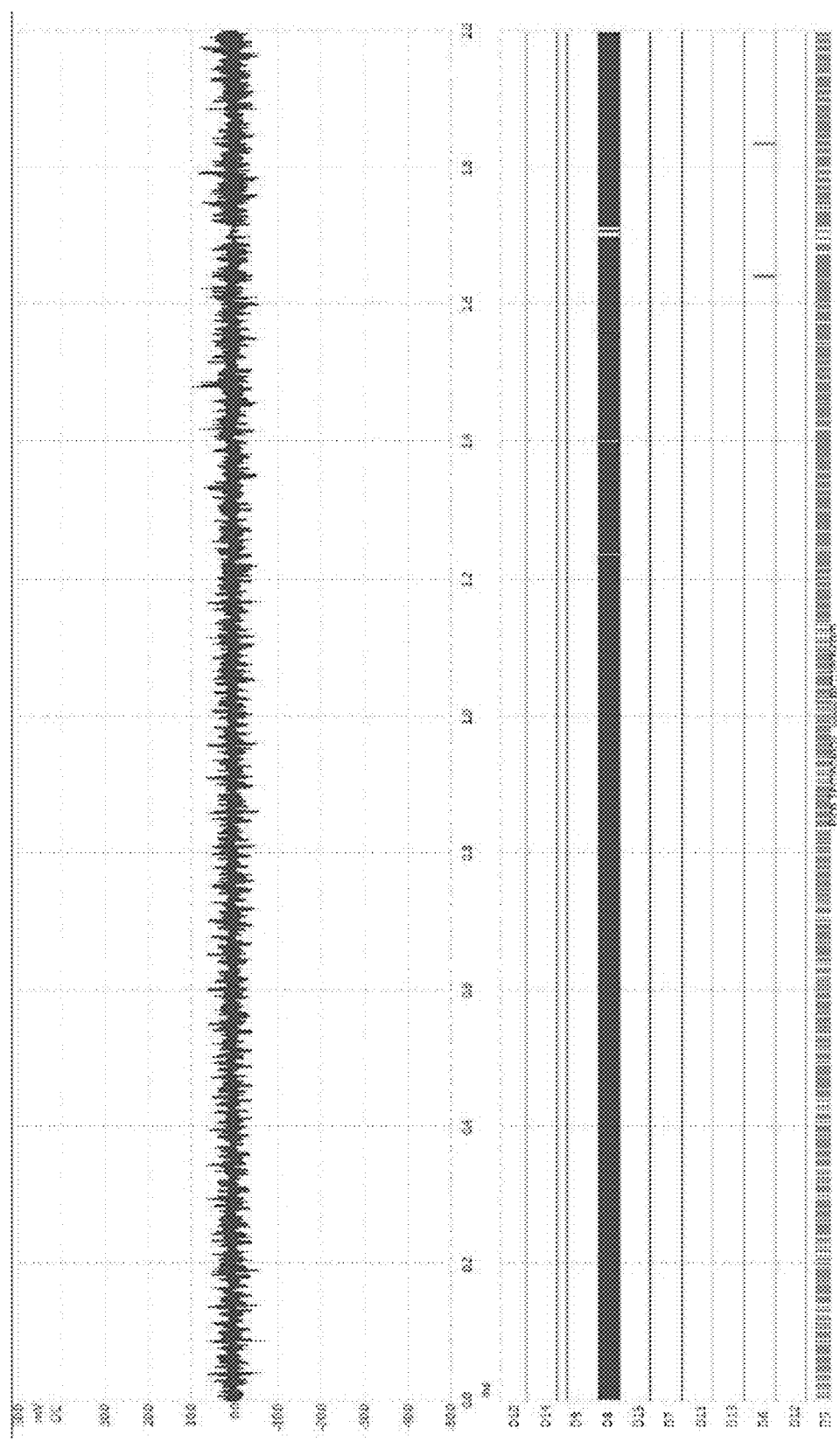
Figure 7G:
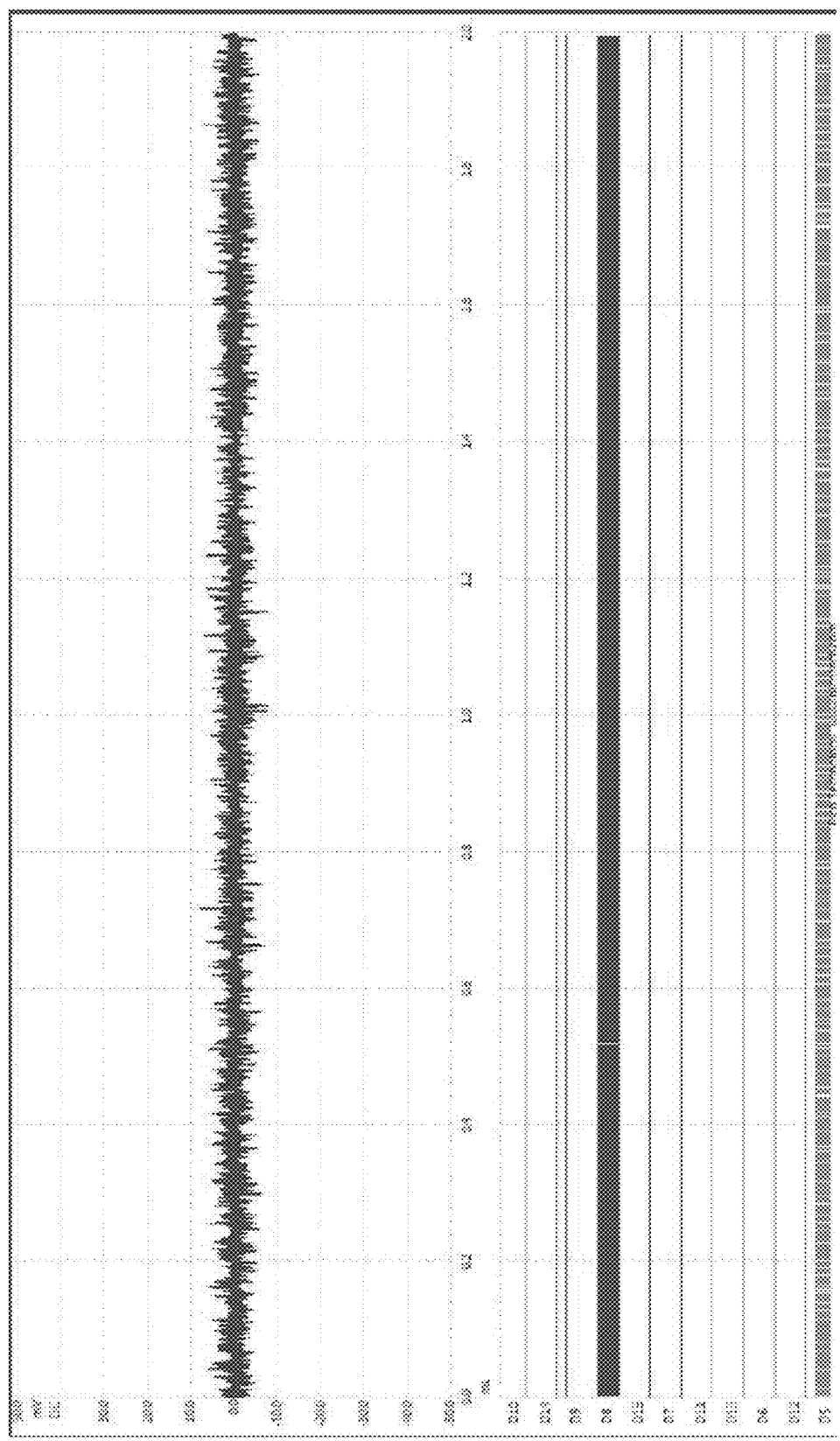
Figure 7H:
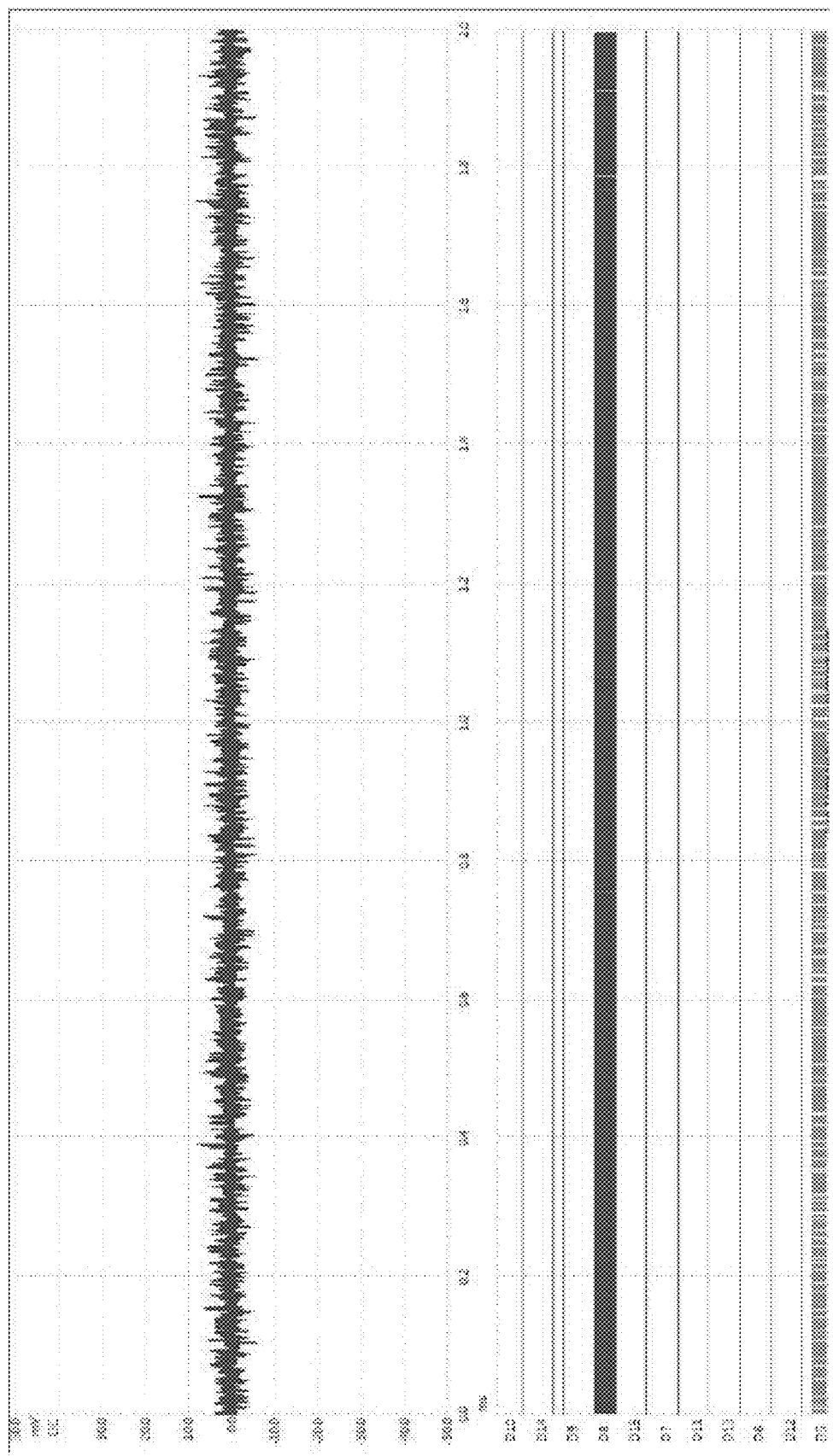

Reference is now made to FIG. 6, which is an illustration of a hardware data collector for monitoring an industrial control system, according to some embodiments of the invention. For example, an ICS setup comprises a Motorola RTU, model MOSCAD series 4, with an I/O module installed on the PLC system bus and running internal logic. In this example, a PLC system bus data collection device may be a PicoScope 2205 mixed-signal digital oscilloscope 180. In this example, the oscilloscope's digital and analog probes 185A and 185B are connected directly to the PLC system bus through an analog interface 186 and a digital interface 185. Example measurements are recorded and stored for analysis by connecting the data collection device 180 to a personal computer using a universal serial bus interface 184. Analysis may be implemented on the stored data using semi-supervised machine learning. Some of the pattern recognition methods may include k-nearest neighbors (k-NN), local outlier factor (LOF), and/or cluster analysis. All methods show good results in classification properties and attributes. Reference is now made to FIG. 7A through FIG. 7H, which are graphs representing data collected from a programmable logic controller system bus by a hardware data collector for monitoring an industrial control system, according to some embodiments of the invention. The signals collected may show the normal operation of the PLC.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant programmable logic controllers will be developed and the scope of the term programmable logic controller is intended to include all such new technologies a priori.

It is expected that during the life of a patent maturing from this application many relevant machine learning methods will be developed and the scope of the term machine learning is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for remote and automatic monitoring of control systems using an analog data collection device, comprising:
    at an at least one electronic hardware analog data collection device which is connected to a monitoring network and electronically connected to at least one conductor electronically connecting between at least one computerized control device and at least one device controlled by said at least one computerized control device:
        measuring a plurality of electronic measurement values measured on said at least one conductor; and
        storing said plurality of electronic measurement values in a data buffer of said at least one electronic hardware analog data collection device;
    at a monitoring server having a monitoring network interface:
        performing remote and automatic monitoring of said at least one device which is controlled by said at least one computerized control device by:
            using said monitoring network interface for acquiring said plurality of electronic measurement values through the monitoring network;
            calculating automatically at least one normal data pattern based on an analysis of said plurality of electronic measurement values;
            matching between at least one new electronic measurement value measured on said at least one at least one computerized control device and said at least one normal data pattern;
            automatically detecting at least one abnormal data pattern; and
            sending automatically an abnormal operation alert to be presented on at least one monitoring interface, in response to said detection of said at least one abnormal data pattern.

2. The computerized method of claim 1, wherein said at least one conductor is at least one system bus conductor of said at least one computerized control device, wherein said plurality of electronic measurement values correspond to any of a plurality of internal data and a plurality of internal operations of said at least one computerized control device.

3. The computerized method of claim 1, wherein said at least one conductor is at least one digital output control conductor of said at least one computerized control device, and said plurality of electronic measurement values correspond to a plurality of external digital control operations performed by said at least one computerized control device.

4. The computerized method of claim 1, wherein said at least one conductor is at least one digital input receiving conductor of said at least one computerized control device, and said plurality of electronic measurement values correspond to a plurality of external digital input operations received to said at least one computerized control device.

5. The computerized method of claim 1, wherein said at least one conductor is at least one analog output control conductor of said at least one computerized control device, and said plurality of electronic measurement values correspond to a plurality of external analog control operations performed by said at least one computerized control device.

6. The computerized method of claim 1, wherein said at least one conductor is at least one analog input receiving conductor of said at least one computerized control device, and said plurality of electronic measurement values correspond to a plurality of external analog input operations received to said at least one computerized control device.

7. The computerized method of claim 1, wherein any one of said plurality of electronic measurement values is an electrical voltage measurement.

8. The computerized method of claim 1, wherein any one of said plurality of electronic measurement values is an electrical current measurement.

9. The computerized method of claim 1, wherein any one of said plurality of electronic measurement values is associated with a time value of measurement, and said at least one normal data pattern is further based on said time value of measurement.

10. The computerized method of claim 1, wherein any one of said plurality of electronic measurement values is associated with a spatial value of said at least one computerized control device, and said at least one normal data pattern is further based on said spatial value.

11. The computerized method of claim 1, wherein any one of said plurality of electronic measurement values is associated with a group connection value of said at least one computerized control device to at least one second computerized control device, and said at least one normal data pattern is further based on said group connection value.

12. The computerized method of claim 1, wherein said at least one normal data pattern is calculated using a local outlier factor analysis.

13. The computerized method of claim 1, wherein said at least one normal data pattern is calculated using a cluster analysis.

14. The computerized method of claim 1, wherein said at least one normal data pattern is calculated using a k-nearest neighbor analysis.

15. The computerized method of claim 1, wherein said at least one computerized control device is part of an industrial control system.

16. The computerized method of claim 1, wherein said at least one computerized control device is part of an urban control system.

17. The computerized method of claim 1, wherein said at least one computerized control device is part of a residential infrastructure system.

18. A computer readable medium comprising computer executable instructions adapted to perform the method of claim 1.

19. A computerized device for automatic monitoring of control systems, comprising:
   at least one computerized processing unit for executing processor instructions;
   a learning module which analyze a plurality of electronic measurement values measured by at least one electronic hardware analog data collection device which is connected to a monitoring network and electronically connected to at least one conductor electronically connecting between at least one computerized control device and at least one device controlled by said at least one computerized control device, said plurality of electronic measurement values are measured on said at least one conductor, and automatically calculates at least one normal data pattern of said of electronic measurement values, using said at least one computerized processing unit;
   a monitoring module which performs and automatic monitoring of said at least one device which is controlled by said at least one computerized control device by matching between at least one new electronic measurement values measured on one of said at least one computerized control device and said at least one normal data pattern to detect automatically at least one abnormal data pattern, using said at least one computerized processing unit; and
   at least one data interface for receiving said plurality of electronic measurement values via the monitoring network, receiving said at least one new electronic measurement value and sending an abnormal operation alert to be presented on at least one monitoring interface, in response to said detected abnormal data pattern.

20. A computer program product for automatic and remote monitoring of control systems, comprising:
   a non-transitory computer readable storage medium;
   first program instructions to use a monitoring network interface to receive from at least one electronic hardware analog data collection device through a monitoring network, plurality of electronic measurement values measured on at least one conductor electronically connecting between at least one computerized control device and at least one device controlled by said at least one computerized control device, said at least one electronic hardware analog data collection device being electronically connected to said at least one conductor;
   second program instructions to acquire said plurality of electronic measurement values from said at least one electronic hardware analog data collection device;
   third program instructions to calculate automatically at least one normal data pattern, based on an analysis of said plurality of electronic measurement values;
   fourth program instructions to match between at least one new electronic measurement value measured on said at least one computerized control device and said at least one normal data pattern;
   fifth program instructions to detect automatically at least one abnormal data pattern; and
   sixth program instructions to automatically send an abnormal operation alert to be presented on at least one monitoring interface, in response to said abnormal data pattern detection;
   wherein said first, second, third, fourth, fifth and sixth program instructions are of a method for performing remote and automatic monitoring of said at least one device which is controlled by said at least one computerized control device;
   wherein said first, second, third, fourth, fifth and sixth program instructions are stored on said non-transitory computer readable storage medium.

21. The method of claim 1, wherein said abnormal operation alert is presented on a different one of said at least one monitoring interface according to a severity of said abnormal operation alert.

22. The method of claim 1, wherein a type of abnormal operation alert is selected according to a severity of said abnormal operation.

23. The method of claim 1, wherein said abnormal data pattern is detected based on a comparison to a pre-defined threshold.

* * * * *